US011362824B2

(12) United States Patent
Rao et al.

(10) Patent No.: US 11,362,824 B2
(45) Date of Patent: Jun. 14, 2022

(54) CONTENT MANAGEMENT SYSTEMS AND METHODS USING PROXY REENCRYPTION

(71) Applicant: Intertrust Technologies Corporation, Sunnyvale, CA (US)

(72) Inventors: Vanishree Rao, San Mateo, CA (US); Robert Tarjan, Princeton, NJ (US); David P. Maher, Oakland, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 238 days.

(21) Appl. No.: 16/421,002

(22) Filed: May 23, 2019

(65) Prior Publication Data
US 2019/0363883 A1 Nov. 28, 2019

Related U.S. Application Data

(60) Provisional application No. 62/676,429, filed on May 25, 2018.

(51) Int. Cl.
*H04L 9/30* (2006.01)
*H04L 9/06* (2006.01)

(52) U.S. Cl.
CPC ............. *H04L 9/30* (2013.01); *H04L 9/0618* (2013.01); *H04L 2209/16* (2013.01); *H04L 2209/603* (2013.01); *H04L 2209/76* (2013.01)

(58) Field of Classification Search
CPC ......... H04L 9/30; H04L 9/302; H04L 63/061; H04L 9/088; H04L 9/083; H04L 9/0618;
(Continued)

(56) References Cited

U.S. PATENT DOCUMENTS 6,963,974 B1 * 11/2005 Skinner .................. G06F 21/64
713/168
7,010,808 B1 * 3/2006 Leung ................ H04N 21/4627
713/193
(Continued)

FOREIGN PATENT DOCUMENTS

WO WO-2016161134 A1 * 10/2016 ............. H04K 1/025

OTHER PUBLICATIONS

Susan Hohenberger, Guy N. Rothblum, Abhi Shelat, and Vinod Vaikuntanathan. Securely Obfuscating Re-encryption. In Salil P. Vadhan, editor, Theory of Cryptography, 4th Theory of Cryptography Conference, TCC 2007, Amsterdam, The Netherlands, Feb. 21-24, 2007, Proceedings, vol. 4392 of Lecture Notes in Computer Science, pp. 233-252. Springer, 2007.
(Continued)

*Primary Examiner* — David Garcia Cervetti
(74) *Attorney, Agent, or Firm* — John P. Davis; Thayne and Davis LLC

(57) ABSTRACT

This disclosure relates to systems and methods for managing protected electronic content using proxy reencryption techniques. Rights management architectures are described that may, among other things, provide end-to-end protection of content keys from their point of origination at a content creator and/or content service to end user devices. Proxy reencryption techniques consistent with aspects of the disclosed embodiments may enable transformation of a ciphertext under one public key to a ciphertext containing the same plaintext under another public key. Consistent with embodiments disclosed herein, proxy reencryption processes may be implemented using indistinguishability obfuscation and puncturable public-key encryption schemes, functional encryption, and/or white box obfuscation techniques.

10 Claims, 8 Drawing Sheets

(58) Field of Classification Search
CPC ............. H04L 63/0435; H04L 2209/16; H04L 2209/603; H04L 2209/60; H04L 2209/76; H04L 9/14; H04L 9/0822; H04L 9/0825; H04L 63/0442; H04L 9/0894; H04L 63/045; H04L 9/0861; H04L 2209/24; H04L 63/0428; H04L 2463/101; H04L 9/3263; H04L 9/3247; H04L 9/08; H04L 9/3073; H04L 9/0891; G06F 21/10
See application file for complete search history.

(56) References Cited

U.S. PATENT DOCUMENTS

| | | | | |
|---|---|---|---|---|
| 7,170,999 B1* | 1/2007 | Kessler | H04L | 63/045 380/278 |
| 7,500,269 B2* | 3/2009 | Huotari | H04L | 63/08 713/153 |
| 8,266,448 B2* | 9/2012 | Shi | H04L | 9/3263 713/189 |
| 8,296,583 B2* | 10/2012 | Sparks | G06Q | 30/06 713/193 |
| 8,479,018 B2* | 7/2013 | Futa | H04L | 9/302 713/190 |
| 8,566,247 B1* | 10/2013 | Nagel | H04L | 63/045 380/270 |
| 8,751,800 B1* | 6/2014 | Dorwin | G06F | 21/6209 713/160 |
| 8,954,740 B1* | 2/2015 | Moscaritolo | H04L | 63/065 380/278 |
| 9,374,373 B1* | 6/2016 | Chan | H04L | 9/0891 |
| 9,806,887 B1* | 10/2017 | Campagna | H04L | 9/0822 |
| 2002/0184154 A1* | 12/2002 | Hori | G06F | 21/606 705/50 |
| 2003/0123670 A1* | 7/2003 | Shimada | G06F | 21/121 713/193 |
| 2003/0126430 A1* | 7/2003 | Shimada | H04L | 63/0464 713/155 |
| 2004/0001594 A1* | 1/2004 | Krishnaswamy | H04L | 63/0464 380/277 |
| 2004/0133794 A1* | 7/2004 | Kocher | G06F | 21/62 713/193 |
| 2005/0071280 A1* | 3/2005 | Irwin | H04L | 63/065 705/59 |
| 2005/0235361 A1* | 10/2005 | Alkove | G06F | 21/10 705/51 |
| 2006/0004662 A1* | 1/2006 | Nadalin | H04L | 9/3268 705/50 |
| 2006/0004803 A1* | 1/2006 | Aschen | H04L | 61/1523 |
| 2006/0085352 A1* | 4/2006 | Hug | H04N | 21/25816 348/E7.07 |
| 2007/0100768 A1* | 5/2007 | Boccon-Gibod | H04L | 63/0492 705/59 |
| 2007/0185814 A1* | 8/2007 | Boccon-Gibod | G06Q | 20/1235 705/51 |
| 2007/0294170 A1* | 12/2007 | Vantalon | H04N | 21/4623 705/50 |
| 2009/0013177 A1* | 1/2009 | Lee' | G06F | 21/10 713/158 |
| 2009/0199287 A1* | 8/2009 | Vantalon | G06F | 21/10 726/9 |
| 2009/0210697 A1* | 8/2009 | Chen | H04L | 67/104 713/153 |
| 2010/0058485 A1* | 3/2010 | Gonzalez | G06F | 21/10 726/27 |
| 2010/0138671 A1* | 6/2010 | Kim | G06F | 21/10 713/189 |
| 2011/0047371 A1* | 2/2011 | Timby | G06F | 21/33 713/168 |
| 2011/0145562 A1* | 6/2011 | Mangalore | H04L | 63/0464 380/278 |
| 2012/0201380 A1* | 8/2012 | Kohiyama | G06F | 21/123 380/255 |
| 2012/0275597 A1* | 11/2012 | Knox | G06F | 21/10 380/210 |
| 2012/0278608 A1* | 11/2012 | Kohiyama | G06F | 21/72 713/150 |
| 2012/0284522 A1* | 11/2012 | Lewis | H04L | 65/605 713/181 |
| 2012/0284804 A1* | 11/2012 | Lindquist | H04L | 63/0428 726/29 |
| 2012/0290843 A1* | 11/2012 | Belenky | G06F | 21/00 713/168 |
| 2013/0086393 A1* | 4/2013 | Pogmore | G06F | 16/81 713/189 |
| 2013/0156188 A1* | 6/2013 | Xu | H04L | 9/0827 380/255 |
| 2013/0212388 A1* | 8/2013 | D'Souza | H04L | 9/0825 713/168 |
| 2013/0283392 A1* | 10/2013 | Mirashrafi | G06F | 21/10 726/26 |
| 2014/0095890 A1* | 4/2014 | Mangalore | G06F | 21/60 713/189 |
| 2014/0208097 A1* | 7/2014 | Brandwine | G06F | 21/33 713/164 |
| 2014/0314233 A1* | 10/2014 | Evans | H04N | 21/44055 380/210 |
| 2015/0026452 A1* | 1/2015 | Roelse | H04L | 63/0428 713/150 |
| 2015/0195258 A1* | 7/2015 | Kohiyama | G06F | 21/606 713/168 |
| 2015/0229471 A1* | 8/2015 | Nair | H04L | 9/0822 713/171 |
| 2015/0235011 A1* | 8/2015 | Swaminathan | H04L | 63/0492 713/150 |
| 2017/0006025 A1* | 1/2017 | Liu | H04L | 63/061 |
| 2017/0155628 A1* | 6/2017 | Rohloff | H04L | 9/30 |
| 2017/0323114 A1* | 11/2017 | Egorov | H04L | 63/0435 |
| 2017/0373828 A1* | 12/2017 | Michiels | G06F | 21/75 |
| 2018/0219678 A1* | 8/2018 | Medvinsky | H04L | 9/0822 |
| 2018/0314827 A1* | 11/2018 | Wells | G06F | 9/45558 |
| 2019/0044940 A1* | 2/2019 | Khalil | H04W | 12/06 |
| 2019/0222878 A1* | 7/2019 | Cocchi | H04N | 21/42684 |
| 2019/0258778 A1* | 8/2019 | Park | H04L | 63/10 |
| 2019/0297063 A1* | 9/2019 | De Gaspari | H04L | 9/14 |

OTHER PUBLICATIONS

PKCS1: Rsa cryptography standard, version 2.0. rsa laboratories, 1998.
Shashank Agrawal and David J. Wu. Functional encryption: Deterministic to randomized functions from simple assumptions. Jean-Sebastien Coron and Jesper Buus Nielsen, editors, Advances in Cryptology—EUROCRYPT 2017—36th Annual International Conference on the Theory and Applications of Cryptographic Techniques, Paris, France, Apr. 30-May 4, 2017, Proceedings, Part II, vol. 10211 of Lecture Notes in Computer Science, 2017.

* cited by examiner

CONTENT MANAGEMENT SYSTEMS AND METHODS USING PROXY REENCRYPTION

RELATED APPLICATION

This application claims the benefit of priority under 35 U.S.C. § 119(e) to U.S. Provisional Application No. 62/676,429, filed May 25, 2018, and entitled "SYSTEMS AND METHODS FOR MANAGING ELECTRONIC CONTENT USING PROXY REENCRYPTION," which is hereby incorporated by reference in its entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for managing electronic content. More specifically, the present disclosure relates to systems and methods for managing protected electronic content using proxy reencryption techniques.

In certain digital rights management ("DRM") protocols, content keys may be revealed in the clear to a DRM service. This may be undesirable, as it introduces a potential attack surface. Moreover, content creators, content owners, and/or content service providers may be relatively protective of the distribution of their content keys, and therefore may be less willing to provide these keys to other parties and/or services, including DRM services.

Consistent with embodiments disclosed herein, DRM protocols are described that, in some implementations, may provide end-to-end protection of content keys from their point of origination (e.g., a content creator and/or content service provider) to user devices. In some embodiments, content key ciphertexts communicated to devices may remain encrypted (e.g., encrypted in the RSA v1.5 and/or RSA-OAEP format). Certain embodiments may further provide for message protocols where fewer messages are sent in connection with a DRM license request process, thereby reducing latency associated with such processes.

Various embodiments of the disclosed systems and methods may use a cryptographic functionality that may be referred to in certain instances herein as proxy reencryption ("PRE"). In certain embodiments, PRE may enable transformation of a ciphertext under one public key to a ciphertext containing the same plaintext under another public key. Embodiments of the disclosed PRE implementations may use receiver ciphertext in the RSA-OAEP encryption format, although other suitable encryption formats are also contemplated. Consistent with embodiments disclosed herein, PRE may be implemented using indistinguishability obfuscation ("iO") and puncturable public-key encryption schemes, functional encryption ("FE"), and/or white box obfuscation techniques.

In some embodiments, a simulation-based security model may be used. In further embodiments, functionalities of the various underlying methods may be randomized. In certain embodiments, the disclosed methods may receive as input a content key and output a randomized RSA-OAEP encryption of the content key under a device's public key. In some embodiments, the FE scheme may not necessarily to hide all and/or some of the functionalities of the underlying cryptographic methods.

BRIEF DESCRIPTION OF THE DRAWINGS

The inventive body of work will be readily understood by referring to the following detailed description in conjunction with the accompanying drawings, in which.

DETAILED DESCRIPTION

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, wherein in certain instances, but not necessarily all instances, like parts may be designated by like numerals or descriptions. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure but is merely representative of possible embodiments of the disclosure. In addition, the steps of any method and/or process disclosed herein do not necessarily need to be executed in any specific order, or even sequentially, nor need the steps be executed only once, unless otherwise specified.

Consistent with certain embodiments of the disclosed systems and methods, PRE techniques may be used to, among other things, provide for end-to-end protection of content keys from their point of origination (e.g., a content creator and/or content service provider) to user devices. As detailed below, in certain embodiments, PRE methods consistent with aspects of the disclosed systems and methods may enable transformation of a ciphertext under one public key to a ciphertext containing the same plaintext under another public key.

Content License Provisioning Processes

Figure 1:
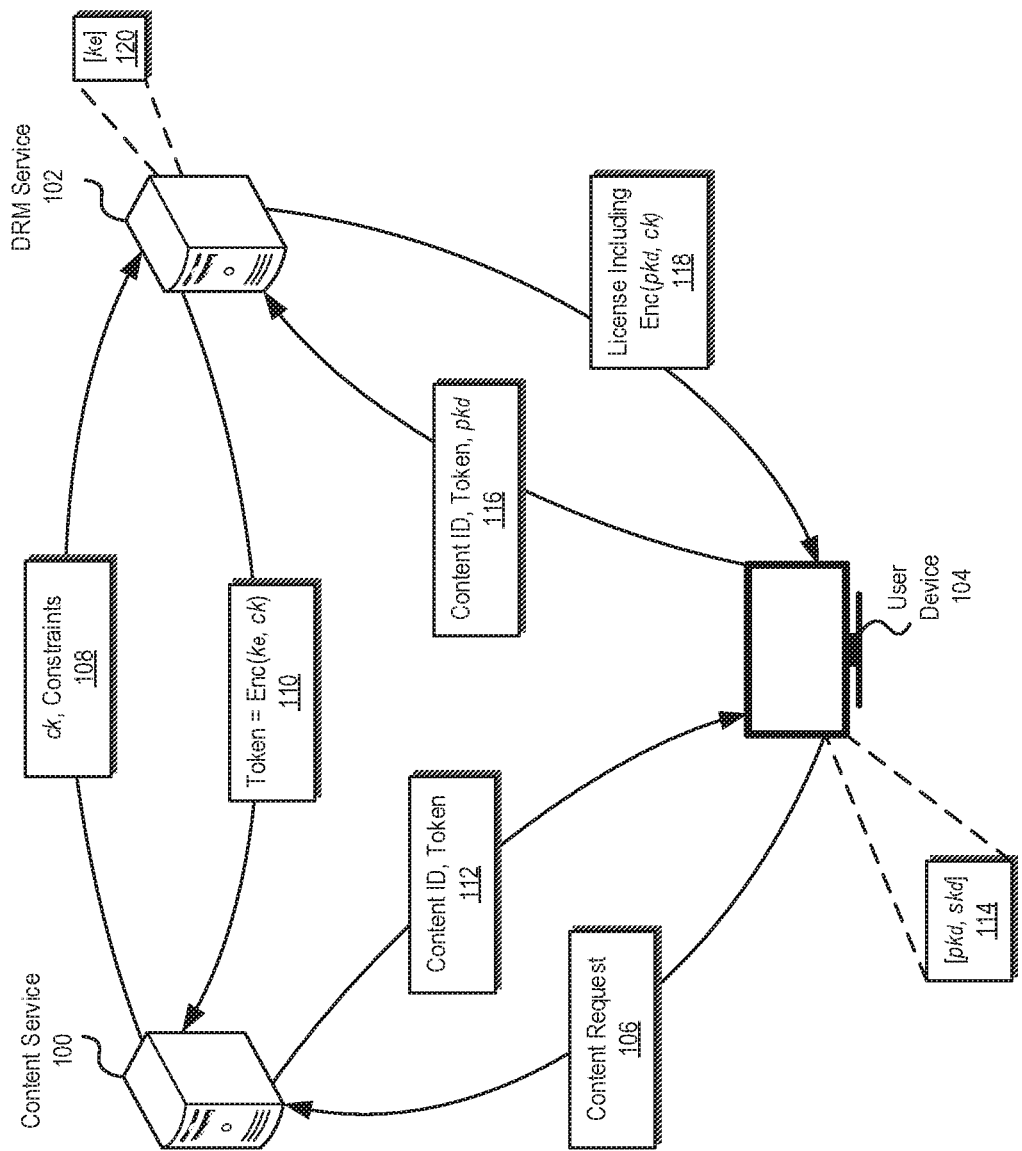
FIG. 1 illustrates an example of an interaction between a content service, a DRM service, and a user device consistent with certain embodiments of the present disclosure.

FIG. 1 illustrates an example of an interaction between a content service 100, a DRM service 102, and a user device 104 consistent with certain embodiments of the present disclosure. In certain embodiments, a DRM license request and/or provisioning process may involve interactions between the content service 100, the DRM service 102, and/or the user device 104. Although embodiments disclosed herein are discussed in connection with interactions between a content service 100, a DRM service 102, and/or a user device 104, it will be appreciated that embodiments of the disclosed systems and processes may be implemented using a variety of other devices, systems, and/or services, and/or involve interactions between other devices, systems, and/or services, including intermediate devices, systems, and/or services. In addition, although illustrated as single systems and/or services, it will be appreciated that, in certain embodiments, the DRM service 102 and/or the content service 100 may be implemented using a plurality of systems operating to deliver content license provisioning services.

The content service 100, DRM service 102, user device 104, and/or one or more other systems and/or services (not shown) may comprise any suitable computing system or combination of systems configured to implement embodiments of the systems and methods disclosed herein. In certain embodiments, the content service 100, DRM service 102, user device 104 and/or one or more other systems and/or services may comprise at least one processor system configured to execute instructions stored on an associated non-transitory computer-readable storage medium. As discussed in more detail below, the content service 100, DRM service 102, user device 104, and/or one or more other systems and/or services and/or other service providers may further comprise a secure processing unit ("SPU") configured to perform sensitive operations such as trusted credential, license, and/or key management, secure policy management, cryptographic operations, and/or other aspects of the systems and methods disclosed herein. The content service 100, DRM service 102, user device 104, and/or one or more other systems and/or services may further comprise software and/or hardware configured to enable electronic communication of information between the devices and/or services via one or more associated network connections.

The content service 100, DRM service 102, user device 104, and/or one or more other systems and/or services may comprise a computing device executing one or more applications configured to implement embodiments of the systems and methods disclosed herein. In certain embodiments, the user device 104 may comprise at least one of a smartphone, a smartwatch, a laptop computer system, a desktop computer system, a display, a gaming system, an entertainment system, a streaming media system, a wearable health monitoring device, a tablet computer, a smart home device, a digital assistant device, a connected appliance, and/or any other computing system and/or device that may be used in connection with the disclosed systems and methods. In certain embodiments, the user device 104 may comprise software and/or hardware configured to request and receive content and/or content licenses from a content service 100, DRM service 102, and/or another system or service, and/or to use received content licenses to decrypt and/or otherwise enable access to, rendering of, and/or use of protected content. The content service 100 may comprise a service and/or system associated with a content creator and/or generator, a content distributor, and/or any other content-related system and/or service.

The content service 100, DRM service 102, user device 104, and/or one or more other systems and/or services may communicate using a network comprising any suitable number of networks and/or network connections. The network connections may comprise a variety of network communication devices and/or channels and may use any suitable communication protocols and/or standards facilitating communication between the connected devices and systems. For example, in some embodiments, the network may comprise the Internet, a local area network, a virtual private network, and/or any other communication network utilizing one or more electronic communication technologies and/or standards (e.g., Ethernet and/or the like). In some embodiments, the network connections may comprise a wireless carrier system such as a personal communications system ("PCS"), and/or any other suitable communication system incorporating any suitable communication standards and/or protocols. In further embodiments, the network connections may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network connections may incorporate one or more satellite communication links. In yet further embodiments, the network connections may use IEEE's 802.11 standards, Bluetooth®, ultra-wide band ("UWB"), Zigbee®, and or any other suitable communication protocol(s).

A license and/or content key request and/or provisioning process consistent with aspects of the disclosed embodiments may result in a DRM license and/or a content key, ck, being communicated to an authorized device that has requested and/or otherwise wishes to access, use, and/or render content. In certain embodiments, the content key may be included in the DRM license and communicated with the license and/or may be communicated separately from the DRM license.

As illustrated, the user device 106 may provide the DRM service 102 with a content request message 106. The content request message 106 may comprise information identifying protected content that the user device 104 would like to access, use, and/or otherwise render, information relating to a type requested content access, and/or the like. In some embodiments, the content request message 106 may be associated with content that the user device 104 has downloaded and/or otherwise stored and would like to access, use, and/or render. In further embodiments, the content request message 106 may be associated with content that the user device 104 would like to download and/or otherwise store for later use. In yet further embodiments, the content request message 106 may be associated with content that the user would like to stream from a service (e.g., the content service 100 and/or another associated service provider).

The content service 100 may provide a DRM service 102 with a content key, ck, associated with the content identified in the content request message 106 and/or associated constraints 108. In some embodiments, the content key and/or associated constraints 108 may be protected during transmission between the content service 100 and/or the DRM service 102 (e.g., using suitable cryptographic encryption and/or other secure communication techniques). In certain embodiments, the constraints may articulate one or more requirements and/or parameters that the DRM service 102 may use in connection with license generation processes.

The DRM service 102 may generate a token 110 based, at least in part, on the content key and the constraints 108 received from the content service 100. In some embodiments, the token 110 may comprise the content key provided by the content service 100, ck, encrypted with a symmetric key of the DRM service, $k_e$ 120. The token 110 may be communicated from the DRM service 102 to the content service 100.

In response to the content request message 106, the content service 100 may return to the user device 104 a message 112 that includes the token provided by the DRM service 102 and/or information that identifies (e.g., uniquely identifies) the associated content.

The user device 104 may be associated with a public key secret-key pair, 114 $pk_d$, $sk_d$. To obtain a license and/or an associated content key, ck, from the DRM service 102, the user device 104 may communicate a license request message 116 to the DRM service 102. The license request message 116 may comprise the information identifying the associated content, the token included in the message 112 received from the content service 100, and/or the public key, $pk_d$, of the user device 104.

The DRM service 102 may determine whether the user device 104 is authorized to access, use, and/or otherwise render the protected content associated with the license request message 116. If the user device 104 is authorized, the DRM service 102 may issue a license 118 to the user device 104. In certain embodiments, the license 118 may comprise an encrypted copy of the content key, ck. For example, the license 118 may comprise the content key, ck, encrypted with the public key, $pk_d$, of the user device 104. The license 118 may further comprise various license terms and/or other associated license information that may be enforced by the user device 104 in connection with the access, use, and/or rendering of the protected content. In certain embodiments, the encrypted content key may be communicated separately from other license information included in the license 118.

In the interaction illustrated in FIG. 1, the DRM service 102 may have access to content keys in the process of relating the content keys from the content service 100 to the user device 104. Accordingly, the content keys in the illustrated interaction may not necessarily be end-to-end protected. In addition, the number of messages exchanged from the time a user device 104 issues a playback request (e.g., by transmitting a content request 106 to the content service 100) to the time when the license 118 and/or content key is received by the user device 104 may introduce higher latency.

In some embodiments, devices may expect ciphertexts in the licenses in a certain format. For example, devices may expect ciphertexts to be encrypted under the RSA-OAEP encryption scheme—a randomized public-key encryptions scheme combining the RSA algorithm with the Optimal Asymmetric Encryption Padding ("OAEP") method. In various embodiments, it may be easier to modify protocols at the DRM service side compared to end user devices. Accordingly, certain embodiments of the disclosed protocol may maintain that ciphertexts received by devices are in an RSA-OAEP format.

Proxy Reencryption Overview

Consistent with certain embodiments of the disclosed systems and methods, a reencryption scheme is described that may allow for conversion of a ciphertext under one public key to a ciphertext (e.g., a ciphertext of the same plaintext) under a different public key. In some embodiments, reencryption may proceed without exposing and/or decrypting the ciphertext outside protected processes. In various embodiments, a reencryption scheme may generate and/or use a special key, which may be referred to in certain instances herein as a reencryption key.

In certain embodiments, the reencryption key may be generated based on a function of a function of a "senders" decryption key and a "receivers" encryption key that converts ciphertexts under the sender's public key to ciphertexts under the receiver's public key. In instances herein, a reencryption key may be denoted as $rk_{c \rightarrow d}$ with the sender's public key $pk_c$ and the receivers public key $pk_d$. In various embodiments, the reencryption key may comprise and/or be included in a protected reencryption program configured to perform reencryption operations consistent with embodiments disclosed herein.

Content License Protocol Using Proxy Reencryption

Figure 2:
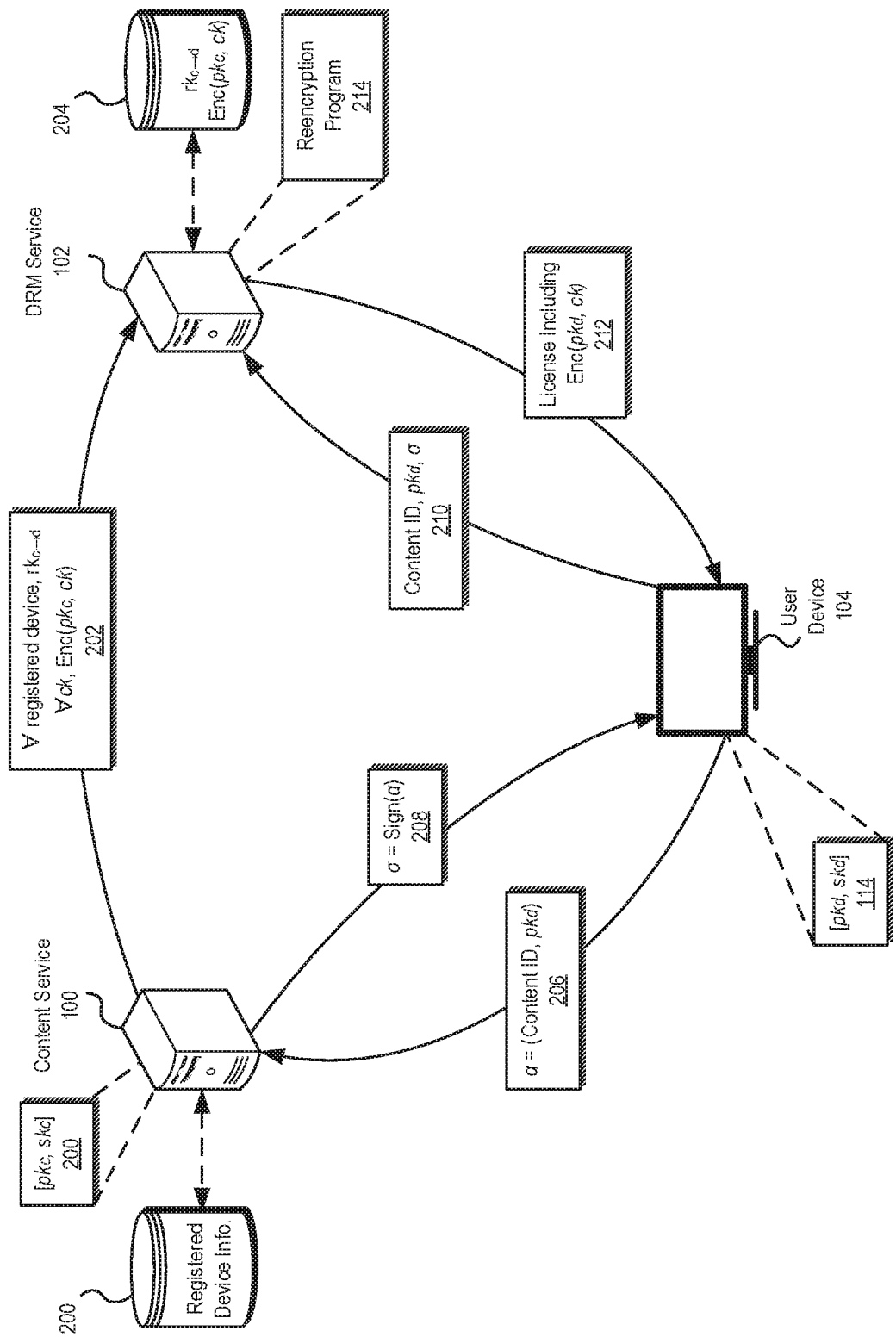
FIG. 2 illustrates an example of an interaction between a content service, a DRM service, and a user device employing a reencryption process consistent with certain embodiments of the present disclosure.

FIG. 2 illustrates an example of an interaction between a content service 100, a DRM service 102, and a user device 104 employing a reencryption process consistent with certain embodiments of the present disclosure. The content service 100 may be associated with a public key secret-key pair 200 $pk_c$, $sk_c$. The content service 100 and/or another associated service and/or system may maintain a database 200 of information relating to one or more registered devices including, for example, the user device 104. In certain embodiments, the device information database 200 may be stored and/or otherwise maintained and/or managed directly by the content service 100. In other embodiments, the device information database 200 may be stored, maintained, and/or managed by a different system and/or service and accessed by the content service 100.

The device information database 200 may include a variety of information relating to registered devices including, for example, public keys associated with registered devices. For example, the device information database 200 may include the public key $pk_d$ of user device 104.

The content service 100 may generate a corresponding reencryption key $rk_{c \rightarrow d}$ for the user device 104. In some embodiments, the content service 100 may generate and/or store reencryption keys for multiple registered devices (e.g., devices having associated information included in the device information database 200). In certain embodiments, computed reencryption keys may be stored, managed, and/or otherwise maintained in the device information database 200.

In some embodiments, the generated reencryption key may comprise a reencryption program. Consistent with various embodiments disclosed herein, the generated reencryption key and/or reencryption program may be used to transform an encryption of a content key under the public key $pk_c$ of the content service 100 to a randomized encryption (e.g., RSA-OAEP encryption) of the content key under the public key of the $pk_d$ user device.

The content service 100 may generate a ciphertext $ct_c$ of the content key ck associated with a content item by encrypting the content key using its public key $pk_c$:$ct_c$=Enc($pk_c$, ck). Applicable registered device information, a generated reencryption key, ciphertext of the encrypted content key $ct_c$, and/or content identification associated with the corresponding content (i.e., a content ID) may be communicated from the content service 100 to the DRM service 102 via message 202.

Information communicated from the content service 100 to the DRM service 102 may be maintained in a database 204. For example, as illustrated, reencryption keys and/or programs and/or ciphertext of encrypted content keys may be stored, managed, and/or otherwise maintained by the DRM service 102 in a database 204. In certain embodiments, the database 204 may be stored and/or otherwise maintained and/or managed directly by the DRM service 102. In other embodiments, the database 204 may be stored, maintained, and/or managed by a different system and/or service and accessed by the DRM service 102.

As discussed in more detail below, when a user device 104 with the public key $pk_d$ makes an authorized request for content, the DRM service 102 may reencrypt the ciphertext containing the corresponding content key and may provide the resulting ciphertext (e.g., RSA ciphertext) and/or the rest of the license to the user device 104. For example, when the user device 104 requests playback for content, the user device 104 may send a content request message α 206 to the content service 100 that may include various parameters associated with the user device 104 and/or the associated content request. For example, the content request message α 206 may comprise an identification of a requested content item (i.e., a content ID) and/or the public key of the user device $pk_d$. In some embodiments, the content request message 206 may comprise information identifying protected content that the user device 104 would like to access, use, and/or otherwise render, information relating to a type requested content access, and/or the like. For example, the content request message 206 may comprise information identifying protected content that the user device 104 has downloaded and/or intends to download and/or stream and render on the user device 104.

The content service 100 may determine whether the user device 104 that sent the content request message α 206 is authorized to access the requested content item. In some embodiments, determining whether the user device 104 is authorized to access the requested content item may be based on information included in the content request message α 206 (e.g., device identification information, the device's public key, and/or the like). If the request is authorized, the content service may sign the content request message α 206 and return a response message σ 208 to the user device 104. In some embodiments, the signature may be generated using a private key $sk_c$ associated with the content service 100, although other suitable signature keys may also be used.

If the request is not authorized, the content service 100 may abort and/or otherwise terminate the protocol. In some embodiments, a message may be communicated to the user device 104 by the content service 100 explicitly denying the content request. In further embodiments, the content service 100 may simply not respond to the content request message α 206 if the content request is denied.

Upon receipt of the response message σ 208 from the content service 100, the user device 104 may communicate a license request message 210 to the DRM service 102. In some embodiments, the license request message 210 may comprise an identification of the requested content item (e.g., a content ID), the public key $pk_d$ of the user device 104, and/or the signed response message σ 208.

The DRM service 102 may verify the signature of the signed response message σ 208 included in the license request message 210 to confirm it was signed by the content service 100. If the signature is not verified, the DRM service 102 may abort and/or otherwise terminate the protocol. For example, in some embodiments, a message may be communicated to the user device 104 by the DRM service 102 explicitly denying the license request. In further embodiments, the DRM service 102 may simply not respond to the license request message 210 if the license request is denied.

If the signature is verified, the DRM service 102 may use a secure reencryption program 214 executing thereon that may comprise the reencryption key $rk_{c \to d}$ to reencrypt the ciphertext $ct_c$=Enc($pk_c$, ck) under the public key $pk_d$ of the user device 104 and generate reencrypted ciphertext $ct_d$: $ct_d \leftarrow$ReEnc($rk_{c \to d}$, $ct_c$). In certain embodiments, the reencrypted ciphertext $ct_d$ may comprise an RSA-OAEP ciphertext including the content key ck associated with the content ID identified in the license request message 210: RSA($pk_d$, ck). In certain embodiments, the reencryption program 214 and/or key may allow the DRM service 102 to only reencrypt the content key. The content key ck may not be revealed in the clear to the DRM service 102 during this process, thus achieving end-to-end protection of the content key. For example, in some embodiments, the reencryption program 214 and/or its operations during a reencryption process may be obfuscated and/or otherwise employ the use of secure software execution methods such that the plaintext of the content key is not revealed to the DRM service 102 and/or revealed outside the secure execution environment of the reencryption program 214.

The DRM service 102 may generate a license 212 that includes the reencrypted ciphertext $ct_d$. The license 212 may further comprise various license terms and/or other associated license information that may be enforced by the user device 104 in connection with the accessing, use, and/or rendering of the content item. In certain embodiments, the reencrypted ciphertext $ct_d$ may be communicated separately from other license information included in the license 212.

The user device 104 may decrypt the reencrypted ciphertext $ct_d$ received in the license 212 using its corresponding secret key, $sk_d$, and may allow access, use, and/or rendering of the content in accordance with any applicable terms included in the license 212.

Instantiation of a Proxy Reencryption Scheme

Consistent with embodiments disclosed herein, a PRE scheme may be constructed with receiver ciphertexts in the RSA-OAEP format. In some embodiments, iO and FE schemes may be used to protect the integrity of secret information during the reencryption process. An FE scheme may, in certain embodiments, comprise an encryption scheme where each secret key is associated with a function and decryption with that secret key provides a function of the plaintext (as compared to the plaintext itself like in a usual encryption scheme). In some embodiments, whitebox cryptographic obfuscation and/or other suitable software obfuscation techniques may be used to protect the integrity of secret information (e.g., plaintext content keys) during a reencryption process).

Proxy Reencryption Instantiation Using Indistinguishability Obfuscation

Figure 3:
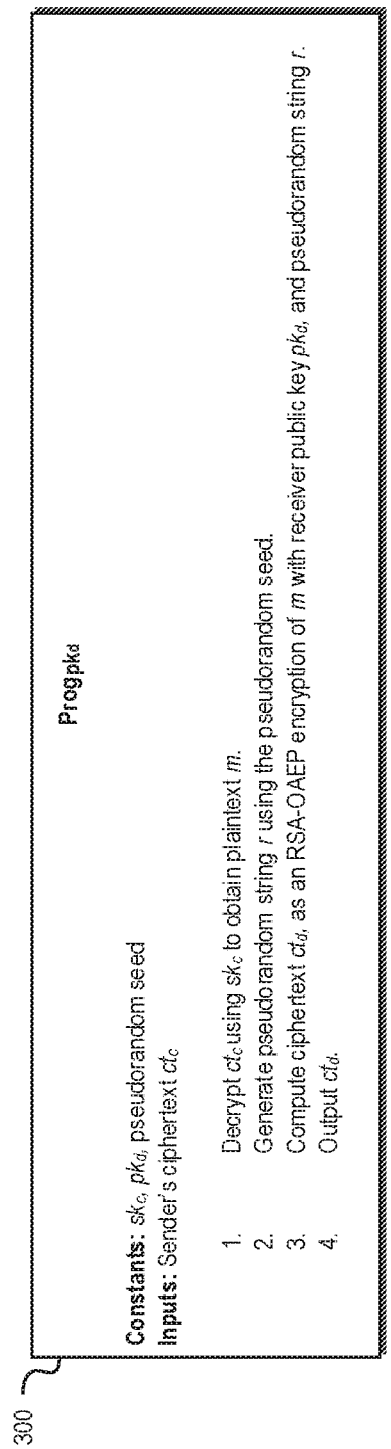
FIG. 3 illustrates an example of a program that may decrypt a content service's ciphertext and perform an encryption operation under the public key of a user device consistent with certain embodiments of the present disclosure.

In some embodiments, a PRE scheme with RSA-OAEP receiver ciphertext format may be instantiated by obfuscating with iO a program that first decrypts the sender's ciphertexts and then encrypts the resulting plaintext with the receiver's public key. FIG. 3 illustrates an example of a program 300 that may decrypt a content service's ciphertext and perform an encryption operation under the public key of a user device $pk_d$ consistent with certain embodiments of the present disclosure. As illustrated, the program may use as constants a sender's secret key, the receiver's public key, and/or a pseudorandom seed value. These constants and/or various aspects of the program 300 and/or its operation during execution may be obfuscated and/or be protected (e.g., using iO and/or other suitable obfuscation and/or protection techniques) such that secret information used by and/or operated on by the program 300 may not be readily revealed to a system executing the program 300 (e.g., a DRM system). The program 300 may further receive as an input ciphertext $ct_c$ received from the sender.

As illustrated, the program 300 may decrypt the ciphertext $ct_c$ using the senders secret key $sk_c$ to obtain plaintext m. A pseudorandom string r may be generated using the pseudorandom seed. Ciphertext $ct_d$ may be generated as an RSA-OAEP encryption of m using the receiver public key $pk_d$ and the generated pseudorandom string r. The program 300 may output the ciphertext $ct_d$ encrypted under the receiver public key $pk_d$.

Figure 4:
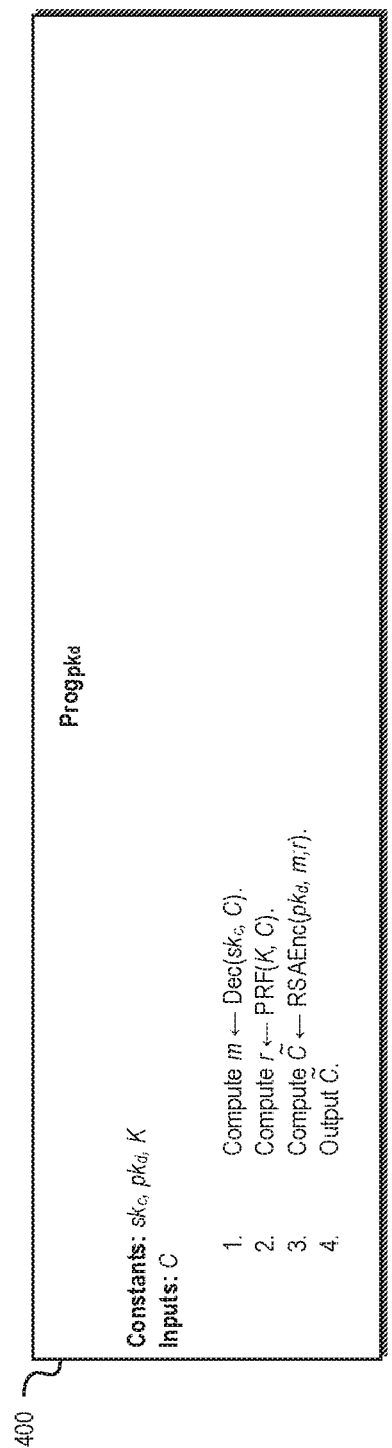
FIG. 4 illustrates an example of a reencryption program consistent with certain embodiments of the present disclosure.

FIG. 4 illustrates another example of a reencryption program 400 consistent with certain embodiments of the present disclosure. In some embodiments, $\zeta$=(KeyGen, Enc, Dec, Punctures, PDec) may be a puncturable public-key encryption scheme, RSA=(RSAKeyGen, RSAEnc, RSA-Dec) may be the RSA-OAEP encryption scheme, and PRF may be a puncturable pseudorandom function. Various aspects of the disclosed embodiments may include one or more of:

Key Generation: The sender's keys may be generated using $\zeta$'s KeyGen. The receiver's keys may be generated using RSA key generation algorithm.

Encryption: The sender's encryption may be performed using the encryption algorithm of $\zeta$ and that of the receiver using RSA encryption.

Decryption: The sender's decryption may be performed using the decryption algorithm of $\zeta$ and that of the receiver using RSA decryption.

Reencryption Key Generation: For a receiver's public key $pk_d$ and sender's secret key $sk_c$, the reencryption key may iO($Prog_{pkd}$), where $Prog_{pkd}$ is illustrated in FIG. 4 as program 400 (an example of a program the decrypts content service ciphertexts and reencrypt under $pk_d$) and $K \leftarrow Key_F$.

Figure 5:
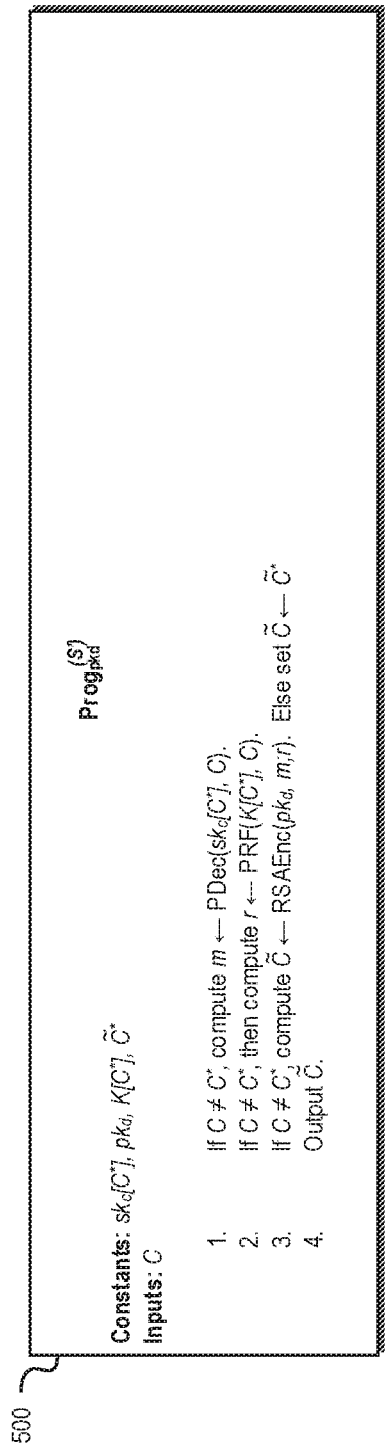
FIG. 5 illustrates an example of an obfuscated reencryption program consistent with certain embodiments of the present disclosure.

FIG. 5 illustrates an example of an obfuscated reencryption program 500 consistent with certain embodiments of the present disclosure. The obfuscated reencryption program 500 may, in certain instances herein, be referred to as $$Prog_{pk_d}^{(S')}$$

where $C^* \leftarrow Enc(pk_c, ck^*)$ and $ck^*$ comprises a random content key, $sk_c[C^*] \leftarrow Puncture_\zeta(sk_c, C^*)$, $K[C^*]=Puncture_F(K, C^*)$, $r^* \leftarrow \$$, and $\widetilde{C^*} \leftarrow RSAEnc(pk_d, ck^*; r^*)$.

Proxy Reencryption Instantiation Using Functional Encryption

In certain embodiments, a PRE scheme may be instantiated with an FE scheme where the functions associated with secret keys may receive a plaintext and output an RSA-OAEP encryption of the plaintext under the receiver's public key. In certain embodiments, rFE may be a functional encryption scheme for a randomized function family $F=\{F_\lambda\}_{\lambda \in N}$ defined as follows: The input space may be the content key space; the output space may be the ciphertext space of RSA encryption with the content key space as the plaintext space. Considering $f \in F_\lambda$, $f$ may be associated with an RSA public key pk corresponding to security parameter $\lambda$. On input ck, $f$ may compute RSAEnc(pk, ck) as the output.

Various aspects of the disclosed embodiments may include one or more of:

Key Generation: The sender's keys may be generated using FE's KeyGen. The receiver's keys may be generated using RSA key generation algorithm.

Encryption: The sender's encryption may be performed using the encryption algorithm of FE and that of the receiver using RSA encryption.

Decryption: The sender's decryption may be performed using the decryption algorithm of FE and that of the receiver using RSA decryption.

Reencryption Key Generation: For a receiver's public key $pk_d$, $sk_{f_d} \leftarrow KeyGen(msk, f_d)$ may be computed, where $f_d$ corresponds to the public key $pk_d$.

Reencryption: Computed as $\tilde{C} \leftarrow (sk_{f_d}, C)$.

Proxy Reencryption Notations

In certain instances herein, $\lambda$ may denote a security parameter. If two distributions $D_1$, $D_2$ are statistically relatively close, then this may be denoted by $D_1 \equiv D_2$. $s \leftarrow S$ may denote randomly sampling an element s from a set S. A bit string s may be sampled uniformly at random, where the length may be implicit, by $s \leftarrow \$$. In certain instances herein, by default, algorithms may receive the security parameter $1^\lambda$ as an input, although in some instances this may not be explicitly specified. Probabilistically polynomial time may be denoted as "PPT". For $n \in N$, [n] may be written to denote the set of integers $\{1, \ldots, n\}$. An interactive Turning Machine may be denoted as A with n rounds by $A_1, \ldots, A_n$ which share states. R may be a randomized function; to distinguish between its inputs and randomness, an invocation may be denoted as $R(x_1, x_2, \ldots; r)$, where $x_1, x_2, \ldots$ are the inputs and r is the randomness.

Negligible Function Definitions

In various embodiments, a function negl may be negligible if $\forall_c \in N$, $\exists n_0 \in N$, such that $\forall_{n \geq n_0}$, $negl(n) < n^{-c}$. A negligible function may be denoted by negl. A reencryption scheme consistent with embodiments disclosed herein may allow conversion of a ciphertext under one public key to a ciphertext (of the same plaintext) under a different public key. As discussed above, a reencryption scheme may provide a special key, that may be referred to herein as a reencryption key, that may be a function of 'sender's' decryption key and 'receiver's' encryption key, that may convert ciphertexts under the sender's public to ciphertexts under the receiver's public key.

Proxy Reencryption Definitions

In some embodiments, a proxy reencryption scheme may comprise a tuple of (that may be probabilistic) polynomial time algorithms (KeyGen, Enc, Dec, RKeyGen, ReEnc), where the components may be defined as follows:

(KeyGen, Enc, Dec) may be the standard key generation, encryption, and decryption algorithms for the underlying cryptosystem. On input the security parameter $1^\lambda$, KeyGen may output a key pair (pk, sk). On input pk and message m, the output of Enc may be a ciphertext ct. On input sk and ciphertext c, the output of Dec may be the message m.

On input $sk_b$, $pk_a$, the reencryption key generation algorithm, RKeyGen, may output the reencryption key $rk_{a \to b}$ for the proxy.

On input $rk_{a \to b}$ and ciphertext $ct_a$, the reencryption function, ReEnc, may output $ct_b$.

Simulation-Based Security of Proxy Reencryption Definitions

For PPT adversaries A, there may exist a simulator $S=S_1, S_2, S_3, S_4, S_5$) such that the following holds. $S_1$ may generate the simulated sender's public key; $S_2$, $S_4$ generate the simulated reencryption keys before and after the adversary receives the set of ciphertexts on the plaintexts of its choice encrypted under the sender's public key; and $S_3$ may generate the simulated reencryption values.

Indistinguishability Obfuscation Definitions

Consistent with various aspects of the disclosed embodiments, an indistinguishability obfuscator may transform any two programs that compute the same functionality into indistinguishable programs that also compute the same functionality. The security provided by an indistinguishability obfuscator may be that, for any two circuits that have the same input-output functionality, their obfuscations are computationally indistinguishable. For example, if $f$ is a functionality and $C_0$ and $C_1$ are circuits corresponding to JAVA and Python implementations respectfully of $f$ then the obfuscations of these circuits may be indistinguishable.

In some embodiments, a uniform PPT machine iO may be called an indistinguishability obfuscator for circuits if the following conditions are satisfied:

For security parameters $\lambda \in N$, for circuits C, for inputs x, for every $C' \leftarrow iO(C)$: $C'(x)=C(x)$.

For any (not necessarily uniform) PPT adversaries Samp, D, there may exist a negligible function $\alpha$ such that the following holds: if $Pr[|C_0|=|C_1|$ and $\forall x, C_0(x)=C_1(x)$: $(C_0, C_1, \sigma) \leftarrow Samp] > 1 - \alpha(\lambda)$, then:

$|Pr[D(\sigma, iO(C_0))=1 : (C_0, C_1, \sigma) \leftarrow Samp] - Pr[D(\sigma, iO(C_1))=1 : (C_0, C_1, \sigma) \leftarrow Samp]| \leq \alpha(\lambda)$ Puncturable Pseudorandom Function ("PRF") Definitions In certain embodiments, a puncturable family of PRFs F may be given by a triple of Turing Machines $Key_F$, $Puncture_F$, and $Eval_F$, and a pair of computable functions $n(\cdot)$ and $m(\cdot)$ that may satisfy the following conditions:

Functionality preserved under puncturing: For PPT adversaries A such that A outputs a PRF input $x^* \in \{0, 1\}^{n(\lambda)}$, $\forall K \in Key_F$, $K[x^*] \leftarrow Puncture_F$ (K, $x^*$): $Eval_F$ (K, x)=$Eval_F$ (K[$x^*$], x).

Pseudorandom at punctured points: For PPT adversaries $(A_1, A_2)$ such that $A_1$ outputs a set $S \subseteq \{0, 1\}^{n(\lambda)}$ and state $\sigma$, an experiment may be constructed where $K \leftarrow Key_F$ and $K[S]=Puncture_F$ (K, S), then:

$|Pr[A_2(\sigma, K[S], S, Eval_F(K,S))=1] - Pr[A_2(\sigma, K[S], S, U_{m(\lambda) \cdot |S|})=1]| = negl(\lambda)$ where $Eval_F$ (K, S) denotes the concatenation of $Eval_F$ (K, $x_1$), ..., $Eval_F$ (K, $x_k$), $S=\{x_1, \ldots, x_k\}$ is the enumeration of the elements of S in lexicographic order and $U_l$ denotes a uniform distribution over $l$ bits.

Puncturable Public Key Encryption Scheme Definitions

In some embodiments, a puncturable public key encryption scheme may be given by a tuple of Turing Machines $\zeta$=(KeyGen, Enc, Dec, $Puncture_\zeta$, PDec) with the following syntax examples:

KeyGen→(pk,sk): The key-generation algorithm may output a public-key secret-key pair.

Enc(pk, m)→C: On input a public key pk, a message m, the encryption algorithm may output a ciphertext C.

Dec(sk, C)→m: On input a secret key sk and a ciphertext C, the decryption algorithm may output the plaintext m.

$Puncture_\zeta$ (sk, C)→sk[C]: On input a secret key sk and a ciphertext C, the puncturing algorithm may output a punctured secret key sk[C].

PDec(sk[C*], C)→m: On input a punctured secret key sk[C*] and a ciphertext C, the "punctured" decapsulation algorithm may output the plaintext if $C \neq C^*$; otherwise, it may output $\perp$.

In certain embodiments, the scheme may satisfy the property of extended chosen plaintext attached ("CPA") security. This may property specify that, for PPT adversaries $A=(A_1, A_2)$, there may exist a negligible function $negl(\cdot)$ such that $Adv_{\zeta,A}^{eCPA}$ defined below may be $negl(\lambda)$:

Experiment eCPA:
(pk,sk)←KeyGen
$(m_0, m_1, st) \leftarrow A_1(pk)$
$b^* \leftarrow \{0, 1\}$
$C^* \leftarrow Enc(pk, m_{b^*})$
$sk[C^*] \to Puncture_\zeta(sk, C^*)$
$b' \leftarrow A_2(st, C^*, sk[C^*])$
Output 1 if $b'=b^*$ and 0 otherwise.
$Adv_{\zeta,A}^{eCPA} := |Pr[Experiment\ eCPA \to 1] - \frac{1}{2}|$ In various embodiments, a FE scheme may use a setup algorithm that first generates a master public key—master secret key pair (mpk, msk). A plaintext may be encrypted using mpk. A secret key $sk_f$ may be generated for a functionality $f$ by using a key-generation algorithm. Using such a secret key, a ciphertext may be decrypted to generate $f(m)$, where m is the plaintext encrypted in the ciphertext.

Functional Encryption for Randomized Functionalities Definitions

In some embodiments, a functional encryption scheme rFE for a randomized function family $F=\{F_\lambda\}_\lambda$ over a message space $X=\{X_\lambda\}_\lambda$, a randomness space $R=\{R_\lambda\}_\lambda$ and the output space $Y=\{Y_\lambda\}_\lambda$ comprising a tuple of Turing Machines (Setup, Enc, KeyGen, Dec) may have the following example syntax:

Setup→(mpk, msk): The setup algorithm outputs a master public key mpk and a master secret key msk.

Enc(mpk, m)→ct: On input a master public key mpk and a message m, the encryption algorithm outputs a ciphertext ct.

KeyGen(msk, $f$)→$sk_f$: On input a master secret key msk and a function $f \in F_\lambda$, the key generation algorithm outputs a secret key $sk_f$.

Dec(mpk, $sk_f$, ct)→y/$\perp$: On input a master public key mpk, a secret key $sk_f$ corresponding to some function $f$ and a ciphertext ct, the decryption algorithm either outputs a stringy $y \in Y_\lambda$ or a special symbol $\perp$. In some embodiments, this algorithm may be deterministic.

In certain embodiments, this scheme may satisfy the following correctness property: For every polynomial $n=n(\lambda)$, every $f \in F_\lambda^n$ and every $x \in X_\lambda^n$, the following two distributions may be computationally indistinguishable:

1. Real: $\{D\ ec(mpk, sk_\beta), ct_j\}_{i,j \in [n]}$, where:
   (mpk, msk)←Setup;
   $sk_{f_i}$←KeyGen(msk, $f_i$) for $i \in [n]$;
   $ct_i$←Enc(mpk, $x_j$).

2. Ideal: $\{f_i(x_j; r_{ij})\}_{i,j \in [n]}$, where $r_{ij} \leftarrow R_\lambda$.

Example—Simulation-Security for rFE Definitions

In certain instances herein, $F=\{F_\lambda\}_{\lambda \in N}$ may be a randomized function family over a domain $X=\{X_\lambda\}_{\lambda \in N}$ and randomness space $R=\{R_\lambda\}_{\lambda \in N}$. rFE=(Setup, Enc, KeyGen, Dec) may be a randomized FE scheme for F with ciphertext space T. rFE may be simulation-secure against malicious encrypters if there exists an efficient simulator $S=S_1, S_2, S_3, S_4, S_5$) such that for efficient adversaries $A=(A_1, A_2)$ where $A_1$ makes at most $q_1$ key-generation queries and $A_2$ makes at most $q_2$ key-generation queries, the outputs of the following experiments may be computationally indistinguishable:

| Experiment $\text{Real}_A^{rFE}$: | Experiment $\text{Real}_A^{rFE}$: |
|---|---|
| (mpk, msk) ← Setup | (mpk, st') ← $O_1$ |
| (x, st) ← $A_1^{O_1(msk;\cdot),\ O_3(msk;\cdot)}$(mpk), $x \in X_\lambda^{q_c}$ | (x, st) ← $A_1^{O'_1(st';\cdot),\ O'_3(st';\cdot)}$ (mpk) where $x \in X_\lambda^{q_c}$ |
| $ct_i^* \leftarrow \text{Enc}(\text{mpk}, x_i)$ for $i \in [q_c]$ | Let $f'_1, \ldots, f'_{q1}$ be $A_1$'s oracle queries to $O'_1$ (st';) |
| $\alpha \leftarrow A_2^{O_2(msk;\cdot),\ O_3(msk;\cdot)}(\text{msp}, \{ct_i^*\}, \text{st})$ | Pick $r_{ij} \leftarrow R_\lambda$, let $y_{ij} = f_j(x_i; r_{ij})$, $\forall i \in [q_c], j \in [q_1]$ |
| Output (x, {f}, {g}, {y}, $\alpha$) | $(\{ct_i^*\}, O'_2) \leftarrow S_3(st', \{y_{ij}\})$ |
| | $\alpha \leftarrow A_2^{O'_2(st';\cdot),\ O'_3(st';\cdot)}(\text{mpk}, \{ct_i^*\}, \text{st})$ |
| | Output (x, {f'}, {g'}, {y'}, $\alpha$) | where the oracles $O_1(\text{msk}, \cdot)$, $O'_1(\text{st}', \cdot)$, $O_2(\text{msk}, \cdot)$, $O'_2(\text{st}', \cdot)$ are the analogs of the key generation oracles:

Real Experiment: Oracles $O_1(\text{msk}, \cdot)$ and $O_2(\text{msk}, \cdot)$ implement KeyGen(msk,·), and $\{f\}$ is the (ordered) set of key queries made to oracles $O_1(\text{msk}, \cdot)$ and $O_2(\text{msk}, \cdot)$.

Ideal Experiment: Oracles $O'_1(\text{st}', \cdot)$ and $O'_2(\text{st}', \cdot)$ are the simulator algorithms $S_2(\text{st}', \cdot)$ and $S_4(\text{st}', \cdot)$, respectively. The simulator $S_4$ may be given oracle access to KeyIdeal(x,·) which on input a function $f' \in F_\lambda$, output $f'(x_i; r_i)$ for every $x_i \in x$ and $r_i \leftarrow R_\lambda$. The set $\{f'\}$, which may be ordered, may include key queries made to $O'_1(\text{st}', \cdot)$ and the queries $S_4$ makes to KeyIdeal.

Oracles $O_3(\text{msk}, \cdot, \cdot)$ and $O_3(\text{st}', \cdot, \cdot)$ are the decryption oracles that take inputs of the form (g,C) where $g \in F_\lambda$ and $C = \{ct_i\}_{i \in [m]}$ is a collection of m ciphertexts, where m is polynomial in $\lambda$. For queries made in a post-challenge phase, $ct_i' \in C$ for all $i \in [q_c]$.

Real Experiment: On input (g, C), $O_3$ computes $sk_f \leftarrow \text{KeyGen}(\text{msk}, f)$. For $i \in [m]$, it may set $y_i = \text{Dec}(sk_f, ct_i)$ and reply with the ordered set $\{y_i\}_{i \in [m]}$. The ordered set $\{g\}$ may denote the functions that appears in the decryption queries of $A_2$ and $\{y\}$ may denote the set of responses of $O_3$.

Ideal Experiment: On input (g, C), $O'_3$ may do the following:

1. For each $ct'_i \in C'$, invoke the simulator algorithm $S_5(\text{st}', ct'_i)$ to obtain a value $x_i \in X_\lambda \cup \{\bot\}$.
2. For each $i \in \{m\}$, if $x_i = \bot$, then the oracle may set $y'_i = \bot$. Otherwise, the oracle may chose $r_i \leftarrow R_\lambda$ and set $y'_i = g'(x_i; r_i)$.
3. Output the ordered set of responses $\{y'_i\}_{i \in [m]}$ The set $\{g'\}$, which may be ordered, may denote the functions that appear in the decryption queries of $A_2$ and $\{y'\}$ denotes the outputs of $O'_3$.

Proxy Reencryption Using Commutative Encryption Pair

In various embodiments, proxy reencryption may be implemented using a commutative encryption scheme pair. Consistent with embodiments disclosed herein, a commutative encryption scheme pair may describe a process where ciphertexts under a delegator's public key can be converted into ciphertexts of the same plaintexts under the delegatee's public key in the following manner: Consider an encryption of the delegator's secret key under the delegatee's public key. The resulting 'special' ciphertext may be treated as the secret key to 'decrypt' ciphertexts under the delegator's public key. This may result in ciphertexts of the same plaintexts under the delegatee's public key. In some embodiments, the delegatee's encryption/decryption algorithms may be homomorphic with respect to the delegator's encryption/decryption algorithms.

In certain embodiments, there may be a direct mapping between the algorithms of a commutative encryption scheme pair to a PRE scheme. The special ciphertext, that is used to convert ciphertexts from under the delegator's public key to under the delegatee's public key, may comprise the reencryption key.

Proxy Reencryption Using Commutative Encryption Notations

In certain instances herein, $\lambda$ may denote the security parameter. If two distributions $D_1, D_2$ are statistically close, then this may be denoted by $D_1 \sim D_2$. $s \leftarrow S$ may denote randomly sampling an element s from a set S. A bit string s may be denoted as being sampled uniformly at random, where the length is implicit, by $s \leftarrow \$$. The $\leftarrow$ symbol may be overloaded in $y \leftarrow A(x)$ to denote that, upon execution of an algorithm A with x as the input, the output is y. In certain instances herein, every algorithm may receive the security parameter $1^\lambda$, even if it is not explicitly specified.

As discussed above, a function negl may be negligible if $\forall_c \in N$, $\exists n_0 \in N$, such that $\forall_n \geq n_0$, $\text{negl}(n) < n^{-c}$. A negligible function may be denoted by negl. A negligible function may grow slower than other polynomials.

Proxy Reencryption Scheme

In various embodiments, a PRE scheme may allow a secret key holder to create a reencryption key. A semi-trusted proxy, such as a DRM service, can use this key to translate a message m encrypted under the delegator's public key into an encryption of the same message under a delegatee's public key, as specified by the delegator. This may be done without allowing the proxy the ability to perform tasks outside of these proxy delegations. For example, in some embodiments, the proxy can neither recover the delegator's secret key nor decrypt the delegator's ciphertext.

In some embodiments, a PRE scheme may comprise the following algorithms, where a, b may be two special symbols corresponding to delegator and delegate, respectively:

(pk$_\delta$, sk$_\delta$) ← KeyGen($\delta$): The key generation algorithm may take $\delta \in \{a,b\}$ and generate a public/secret key pair (pk$_\delta$, sk$_\delta$).

ct ← Enc($\delta$, pk$_\delta$, m): The encryption algorithm may take as input $\delta \in \{a,b\}$, a public key pk$_\delta$, and a message m. It may output a ciphertext ct under pk$_\delta$.

m ← Dec($\delta$, sk$_\delta$, ct): The decryption algorithm may take as input $\delta \in \{a,b\}$, a secret key sk$_\delta$ and a ciphertext ct under pk$_\delta$. It may output a message m.

rk ← ReKeyGen(sk$_a$, pk$_b$): The reencryption key generation algorithm may take as input a private key sk$_a$ and another public key pk$_b$. It may output a reencryption key rk.

ct$_b$ ← ReEnc(rk, ct$_a$): The reencryption algorithm may take as input a reencryption key rk and a ciphertext ct$_a$ under public key pk$_a$. It may output a ciphertext ct$_b$ under public key pk$_b$.

In certain embodiments, a PRE scheme may satisfy the following correctness property: Informally, a party holding a secret key sk$_b$ may be able to decrypt ciphertexts encrypted under pk$_b$ and also ciphertexts generated as ReEnc(rk, ct$_a$). Formally, correctness may be satisfied as follows:

1. The following may correspond to the correctness of (KeyGen, Enc, Dec) being an encryption scheme. $\forall$(pk,sk) ← KeyGen($\delta$), $\forall$m, $\forall$ct ← Enc($\delta$, pk, m): Dec($\delta$,sk, ct)=m.

2. The following may correspond to a requirement that reencrypted ciphertexts are decrypted correctly by the delegatee.

$\forall (pk_a, sk_a) \leftarrow \text{KeyGen}(a)$,
$\forall (pk_b, sk_b) \leftarrow \text{KeyGen}(b)$,
$\forall m, \forall ct_a \leftarrow \text{Enc}(a, pk_a, m)$,
$\forall rk \leftarrow \text{ReKeyGen}(sk_a, pk_b)$,
$\forall ct_b \leftarrow \text{ReEnc}(rk, ct_a)$
$\text{Dec}(b, sk_b, ct_b) = m$ Obfuscation Security of Proxy Reencryption In certain embodiments, average-case obfuscation security for PRE may view having access to a reencryption key as equivalent to having a black-box (and/or oracle) access to the corresponding reencryption functionality. In other words, an efficient adversary may not learn either the delegator's secret key and/or the plaintexts.

A PRE scheme $\zeta = (\text{KeyGen}, \text{Enc}, \text{Dec}, \text{ReKeyGen}, \text{ReEnc})$ may be said to be average-case obfuscation secure if the following holds: For any efficient adversary A, there may exist an efficient simulator S and a negligible function $\text{negl}(\cdot)$, such that:

$$\left| \Pr \begin{bmatrix} (pk_a, sk_a) \leftarrow \text{KeyGen}(a), \\ (pk_b, sk_b) \leftarrow \text{KeyGen}(b), \\ rk \leftarrow \text{ReKeyGen}(sk_a, pk_b) \end{bmatrix} : \mathcal{A}^{O[sk_a, pk_b](\cdot)}(pk_a, pk_b, rk) \to 1 \right.$$
$$\left. - \Pr \begin{bmatrix} (pk_a, sk_a) \leftarrow \text{KeyGen}(a) \\ (pk_b, sk_b) \leftarrow \text{KeyGen}(b) \end{bmatrix} : \mathcal{A}^{O[sk_a, pk_b](\cdot)}(pk_a, pk_b, S^{O[sk_a, pk_b](\cdot)}) \to 1 \right| \leq$$

$$\text{negl}(\lambda)$$

where $O[sk_a, pk_b](\cdot)$ is an oracle that may take as an input a ciphertext $ct_a$ under $pk_a$ and output $\text{Enc}(b, pk_b, m)$, where $m \leftarrow \text{Dec}(a, sk_a, pk_a)$. In other words, the oracle may perform the reencryption function by first decrypting the input ciphertext with $sk_a$, then encrypting the resulting plaintext with $pk_b$, and outputting the resulting ciphertext.

Average-case obfuscation security may capture CPA security for the delegatee. A proxy reencryption scheme consistent with various aspects of the disclosed embodiments may further satisfy CPA security for the delegator.

Commutative Encryption Schemes

Consistent with various embodiments, a PRE key and/or associated reencryption program may essentially perform a decryption followed by an encryption, without revealing the details of the decryption (i.e., the decryption key or the decrypted plaintext). The PRE key and/or associated reencryption program may "contain" the delegator's secret key, but not in the clear. Hence, the secret key may be encoded/encrypted in a suitable manner.

Figure 6:
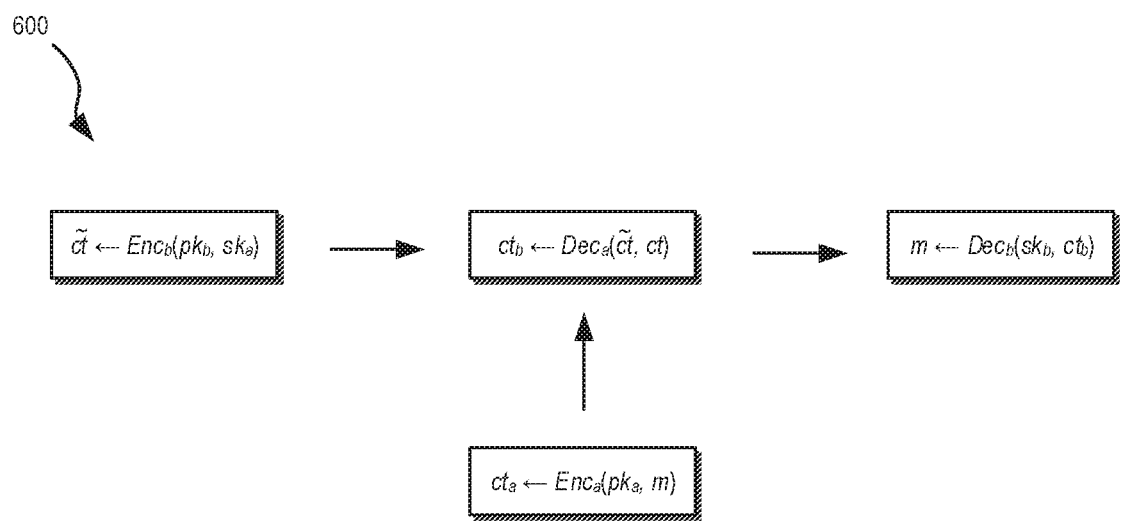
FIG. 6 illustrates a diagram of a representation of an example of a commutative encryption scheme consistent with certain embodiments of the present disclosure.

In some embodiments, the pair of schemes is such that, if the delegator's secret key is encrypted under the delegatee's public key, then the resulting ciphertext can be used to perform decryptions of ciphertexts under delegator's public key 'under the hood'. That is, the decrypted value may still be under the delegatee's public key. In certain embodiments, this may be described as a limited form of homomorphic property of the delegatee's public-key encryption ("PKE") scheme with respect to the delegator's PKE scheme. In some embodiments, the PRE key could contain an encryption under the delegatee's public key of the delegator's secret key. With this, ciphertexts under delegator's public key can be transformed into ciphertexts of the same plaintexts under the delegatee's public key. FIG. 6 illustrates a diagram of a representation 600 of an example of a commutative encryption scheme consistent with certain embodiments of the present disclosure.

Commutative Encryption Scheme Definitions

In some embodiments, an ordered pair of chosen-ciphertext attack ("CPA") secure encryption schemes $(\Sigma_a, \Sigma_b)$ may be said to be commutative if the following holds: Let $\Sigma_a = (\text{KeyGen}_a, \text{Enc}_a, \text{Dec}_a)$ and $\Sigma_b = (\text{KeyGen}_b, \text{Enc}_b, \text{Dec}_b)$. The pair may be said to be commutative if the following holds:

$$\begin{array}{l} \forall (pk_a, sk_a) \leftarrow \text{KeyGen}_a(\ ), \\ \forall (pk_b, sk_b) \leftarrow \text{KeyGen}_b(\ ), \\ \forall m, \\ \forall \tilde{ct} \leftarrow \text{Enc}_b(pk_b, sk_a), \\ \forall ct_a \leftarrow \text{Enc}_a(pk_a, m) \end{array} : \begin{array}{l} ct_b \leftarrow \text{Dec}_a(\tilde{ct}, ct) \\ m \leftarrow \text{Dec}_b(sk_b, ct_b) \end{array}$$

In certain embodiments, the secret-key space of $\Sigma_a$ may be a subset of the plaintext space of $\Sigma_b$ and the ciphertext space of $\Sigma_b$ may be a subset of the secret-key space of $\Sigma_a$.

Proxy Reencryption from a Commutative Encryption Scheme Pair

Consistent with various disclosed embodiments, a PRE scheme may be constructed from a commutative encryption scheme pair. Let $\Sigma_a = (\text{KeyGen}_a, \text{Enc}_a, \text{Dec}_a)$ and $\Sigma_b = (\text{KeyGen}_b, \text{Enc}_b, \text{Dec}_b)$ be a commutative scheme pair. In some embodiments, a PRE scheme may be constructed $\zeta = (\text{KeyGen}, \text{Enc}, \text{Dec}, \text{ReKeyGen}, \text{ReEnc})$ as follows:

KeyGen($\delta$): Run KeyGen$_\delta$. Output the resulting public key/secret key pair.

Enc($\delta$, pk$_\delta$, m): Run Enc$_\delta$(pk$_\delta$, m). Output the resulting ciphertext.

Dec($\delta$, sk$_\delta$, ct): Run Dec$_\delta$(sk$_\delta$, ct). Output the resulting plaintext.

ReKeyGen(sk$_a$, pk$_b$): Compute rk $\leftarrow$ Enc$_b$(pk$_b$, sk$_a$). Output rk.

ReEnc(rk, ct$_a$): Compute ct$_b \leftarrow$ Dec$_a$(rk, ct$_a$). Output ct$_b$.

Correctness: Correctness of the PRE scheme $\zeta$ may be verified. In some embodiments, the correctness property of the scheme may follow from the correctness properties of the underlying encryption schemes. Consider any:

$(pk_a, sk_a) \leftarrow \text{KeyGen}(a) \partial \text{KeyGen}_a(\ )$,
$(pk_b, sk_b) \leftarrow \text{KeyGen}(b) \leftarrow \text{KeyGen}_b(\ )$,
m, ct$_a \leftarrow$ Enc(a, pk$_a$, m)=Enc$_a$(pk$_a$, m)
rk $\leftarrow$ ReKeyGen(sk$_a$, pk$_b$)=Enc$_b$(pk$_b$, sk$_a$)
ct$_b$ ReEnc(rk, ct$_a$)=Dec$_a$(rk, ct$_a$)

Since the encryption scheme pair $\Sigma_a$, $\Sigma_b$ may be commutative: m $\leftarrow$ Dec$_b$(sk$_b$, ct$_b$)

Figure 7:
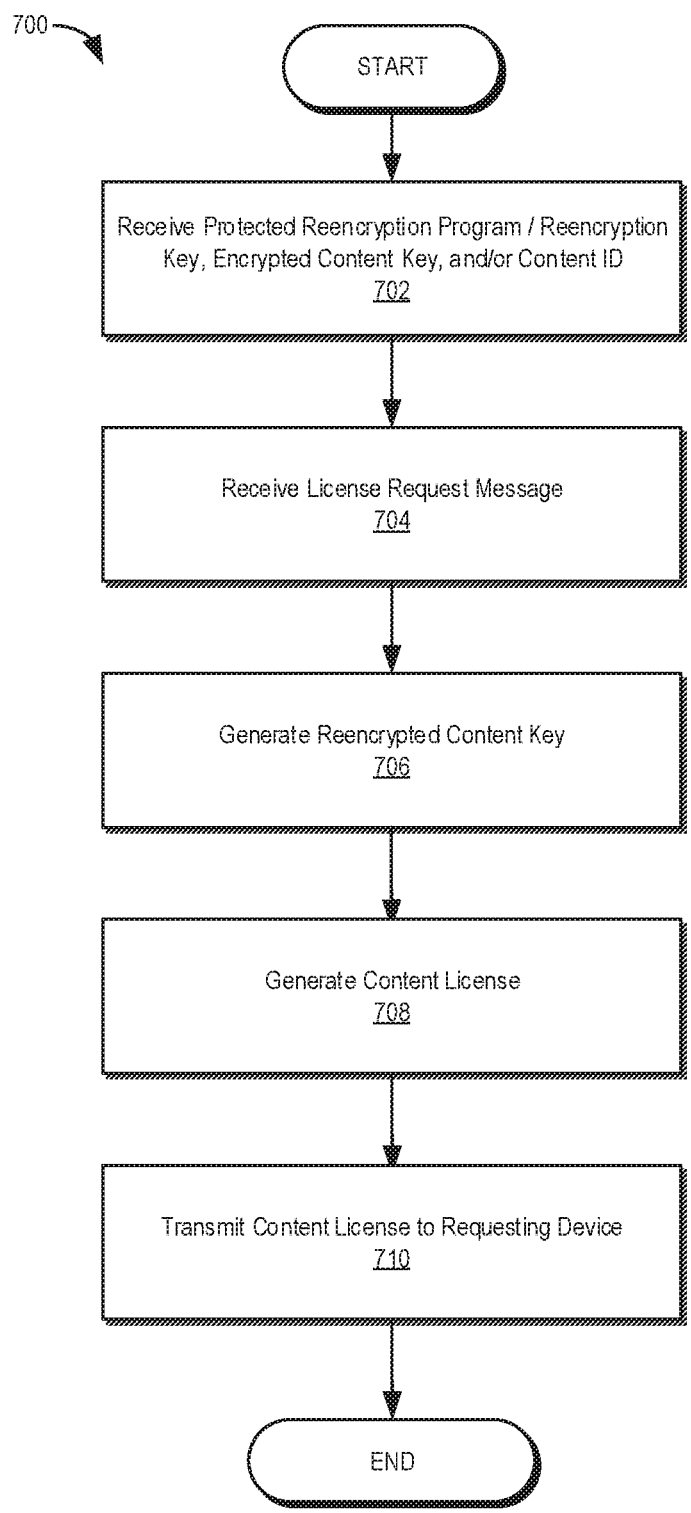
FIG. 7 illustrates an example of a method for managing protected content consistent with certain embodiments of the present disclosure.

FIG. 7 illustrates an example of a method for managing protected content consistent with certain embodiments of the present disclosure. The illustrated method 700 may be implemented in a variety of ways, including using software, firmware, hardware, and/or any combination thereof. In certain embodiments, various aspects of the method 700 and/or its constituent steps may be performed by a user device, a content service, a DRM service, and/or any other suitable system and/or services or combination of systems and/or services.

At 702, a protected reencryption program may be received from a content service system at a rights management system. In various embodiments, the protected reencryption program may comprise an obfuscated program that may be obfuscated using, for example, iO, FE, whitebox cryptographic obfuscation, and/or any other suitable software obfuscation and/or protection technique and/or combination of techniques, including any of the techniques disclosed herein. In some embodiments, the protected reencryption program may include a protected private decryption key of the content service system. The rights management system may further receive from the content service system an encrypted content key encrypted using a public encryption key of the content service system and an identifier of a piece of content associated with the encrypted content key.

A license request message may be received from a user device at 704. In certain embodiments, the license request message may include an identifier associated with the piece of content and/or a public encryption key of the user device. In some embodiments, the license request message may further comprise a signed message. For example, the license request message may comprise a content request message issued by the user device to the content service signed by the content service.

At 706, a reencrypted content key may be generated based on the encrypted content key and the public encryption key of the user device using the protected reencryption program. In some embodiments, the reencrypted content key may be encrypted using the public encryption key of the user device. Consistent with various aspects of the disclosed embodiments, the reencrypted content key may be generated without exposing plaintext of the content key and/or operations using the same to the rights management system during execution of the protected reencryption program.

In some embodiments, generating the reencrypted content key may include decrypting, in a protected execution process, the encrypted content key using the protected private decryption key of the content service system to generate a decrypted content key and, encrypting the decrypted content key using the public encryption key of the user device to generate the reencrypted content key.

A content license associated with the piece of content that includes the reencrypted content key and/or any associate licenses terms may be generated at 708. At 710, the generated content license may be communicated to the user device.

Figure 8:
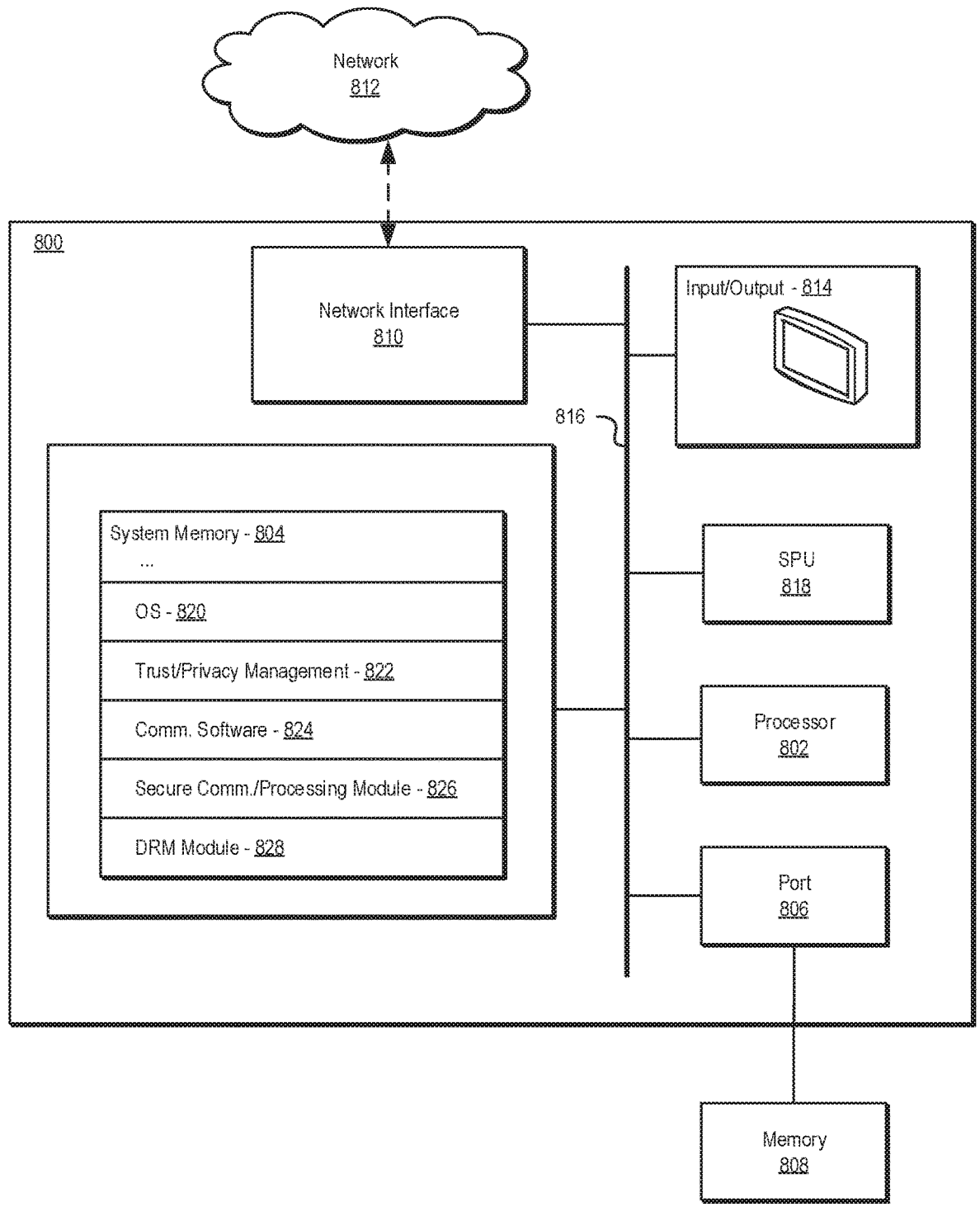
FIG. 8 illustrates an example of a system that may be used to implement certain embodiments of the systems and methods of the present disclosure.

FIG. 8 illustrates an exemplary system 800 that may be used to implement embodiments of the systems and methods of the present disclosure. Certain elements associated with the illustrated exemplary system may be included in a user device, a content service, a DRM service, and/or any other system and/or service configured to implement embodiments of the disclosed systems and methods.

As illustrated in FIG. 8, the system 800 may include: a processing unit 802; system memory 804, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 802; a port 806 for interfacing with removable memory 808 that may include one or more diskettes, optical storage mediums, and/or other non-transitory computer-readable storage mediums (e.g., flash memory, thumb drives, USB dongles, compact discs, DVDs, etc.); a network interface 810 for communicating with other systems via one or more network connections 812 using one or more communication technologies; a user interface 814 that may include a display and/or one or more input/output devices such as, for example, a touchscreen, a keyboard, a mouse, a track pad, and the like; and one or more busses 816 for communicatively coupling the elements of the system.

In some embodiments, the system 800 may, alternatively or in addition, include an SPU 818 that is protected from tampering by a user of the system or other entities by utilizing secure physical and/or virtual security techniques. An SPU 818 can help enhance the security of sensitive operations such as personal information management, trusted credential and/or key management, license, privacy, and policy management, and other aspects of the systems and methods disclosed herein. In certain embodiments, the SPU 818 may operate in a logically secure processing domain and be configured to protect and operate on secret information, including cryptographic keys, as described herein. In some embodiments, the SPU 818 may include internal memory storing executable instructions or programs configured to enable the SPU 818 to perform secure operations.

The operation of the system 800 may be generally controlled by a processing unit 802 and/or an SPU 818 operating by executing software instructions and programs stored in the system memory 804 (and/or other computer-readable media, such as removable memory 808). The system memory 804 may store a variety of executable programs or modules for controlling the operation of the system. For example, the system memory may include an operating system ("OS") 820 that may manage and coordinate, at least in part, system hardware resources and provide for common services for execution of various applications and a trust and privacy management system 822 for implementing trust and privacy management functionality including protection and/or management of secure data and/or keys through management and/or enforcement of associated policies. The system memory 804 may further include, without limitation, communication software 824 configured to enable in part communication with and by the system 800; one or more applications; a secure communication and/or processing module 826 configured to perform various aspects of the disclosed embodiments (e.g., message generation, cryptographic operations, etc.), a DRM module 828 configured to perform various aspects of the disclosed embodiments (e.g., license request and/or response generation and/or processing, cryptographic operations including protected reencryption operations, and/or the like), and/or any other information and/or applications configured to implement embodiments of the systems and methods disclosed herein.

The systems and methods disclosed herein are not inherently related to any particular computer, device, service, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, an optical storage medium, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method for managing protected content performed by a rights management system comprising a processor and a non-transitory computer-readable medium storing instructions that, when executed by the processor, cause the system to perform the method, the method comprising:
   receiving, from a content service system, a protected reencryption program, an encrypted content key encrypted using a public encryption key of the content service system, and an identifier of a piece of content associated with the encrypted content key, the protected reencryption program comprising a protected private decryption key of the content service system;
   receiving, from a user device, a license request message, the license request message comprising the identifier of the piece of content and a public encryption key of the user device;
   generating a reencrypted content key using the protected reencryption program based on the encrypted content key and the public encryption key of the user device, wherein generating the reencrypted content key comprises:
       decrypting the encrypted content key by the protected reencryption program to generate a content key, and
       encrypting the content key using the public encryption key of the user device to generate the reencrypted content key,
   wherein decrypting the encrypted content key to generate the content key and encrypting the content key to generate the reencrypted content key are performed without exposing plaintext of the content key to the rights management system outside the protected reencryption program during execution of the protected reencryption program;
   generating a content license associated with the piece of content, the content license comprising the reencrypted content key; and
   transmitting the content license to the user device.

2. The method of claim 1, wherein the license request message further comprises a signed message.

3. The method of claim 2, wherein the method further comprises:
   prior to generating the reencrypted content key and the content license, verifying a signature of the signed message.

4. The method of claim 3, wherein the signed message comprises a content request message issued by the user device to the content service signed by the content service.

5. The method of claim 3, wherein verifying the signature of the signed message comprises verifying that the signed message has been signed by the content service system.

6. The method of claim 1, wherein generating the reencrypted content key comprises generating the reencrypted content key without exposing the protected private decryption key of the content service system to the rights management system during execution of the protected reencryption program.

7. The method of claim 1, wherein the protected reencryption program comprises an obfuscated program.

8. The method of claim 7, wherein the protected reencryption program is obfuscated using indistinguishability obfuscation.

9. The method of claim 7, wherein the protected reencryption program is obfuscated using whitebox cryptographic obfuscation.

10. The method of claim 1, wherein the license further comprises one or more license terms relating to use of the piece of content.

* * * * *